(12) United States Patent
Cai et al.

(10) Patent No.: US 12,516,233 B2
(45) Date of Patent: Jan. 6, 2026

(54) POROUS POLYMER COMPOSITE FOR DAYTIME RADIATIVE COOLING AND METHOD OF MAKING A POROUS POLYMER COMPOSITE

(71) Applicant: The Board of Trustees of the University of Illinois, Urbana, IL (US)

(72) Inventors: Lili Cai, Champaign, IL (US); Kai Zhou, Urbana, IL (US); Xiao Yan, Urbana, IL (US); Nenad Miljkovic, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 847 days.

(21) Appl. No.: 17/854,786

(22) Filed: Jun. 30, 2022

(65) Prior Publication Data

US 2023/0012311 A1    Jan. 12, 2023

Related U.S. Application Data

(60) Provisional application No. 63/219,969, filed on Jul. 9, 2021.

(51) Int. Cl.
| | |
|---|---|
| *C09K 5/14* | (2006.01) |
| *B29C 43/02* | (2006.01) |
| *B29K 509/00* | (2006.01) |
| *C08J 9/00* | (2006.01) |

(52) U.S. Cl.
CPC .............. *C09K 5/14* (2013.01); *B29C 43/021* (2013.01); *C08J 9/0066* (2013.01); *B29K 2023/06* (2013.01); *B29K 2509/00* (2013.01); *B29K 2995/0012* (2013.01); *C08J 2207/00* (2013.01); *C08J 2323/06* (2013.01); *C08J 2423/06* (2013.01)

(58) Field of Classification Search
CPC ........ C09K 5/14; B29C 43/021; C08J 9/0066; C08J 2207/00; C08J 2323/06; C08J 2423/06; C08J 9/0061; C08J 2201/0522; C08J 9/28; C08J 2205/042; C08J 2205/044; B29K 2023/06; B29K 2509/00; B29K 2995/0012
See application file for complete search history.

(56) References Cited

U.S. PATENT DOCUMENTS

| 10,386,097 B2 | 8/2019 | Yu et al. |
| 10,724,809 B2 | 7/2020 | Yang et al. |

(Continued)

OTHER PUBLICATIONS

Bansil, "Phase Separation in Polymer Solutions and Gels," J. Phys. IV, 3 (1993), pp. C1-225-C1-235.

(Continued)

*Primary Examiner* — Andrew J. Oyer
(74) *Attorney, Agent, or Firm* — Crowell & Moring LLP

(57) ABSTRACT

A porous polymer composite for daytime radiative cooling includes a porous polymer matrix comprising a thermoplastic polymer and including a plurality of pores, and selectively emitting particles dispersed in the porous polymer matrix. When exposed to solar radiation, the porous polymer composite comprises an infrared emissivity of at least about 80% in a wavelength range of 8-13 μm and/or a solar reflectivity of at least about 80% in a wavelength range of 0.3-2 μm.

20 Claims, 19 Drawing Sheets

(56) References Cited

U.S. PATENT DOCUMENTS

| | | | | |
|---|---|---|---|---|
| 2003/0215632 | A1* | 11/2003 | Jen | D02G 3/441 |
| | | | | 428/375 |
| 2018/0192720 | A1* | 7/2018 | Blackford | A41D 31/04 |
| 2019/0239586 | A1* | 8/2019 | Cui | A41D 31/14 |

OTHER PUBLICATIONS

Bao et al., "Double-Layer Nanoparticle-Based Coatings for Efficient Terrestrial Radiative Cooling," Sol. Energy Mater. Sol. Cells, 168 (2017), pp. 78-84.

Bartoli et al., "Nocturnal and Diurnal Performances of Selective Radiators," Appl. Energy, 3 (1977), pp. 267-286.

Berdahl, "Radiative Cooling with MgO and/or LiF Layers," Appl. Opt., 23, 3 (1984), pp. 370-372.

Boutghatin et al., "Impact of $SiO_2$ Particles in Polyethylene Textile Membrane for Indoor Personal Heating," Nanomaterials, 10, 1968 (2020) pp. 1-10.

Cai et al., "Spectrally Selective Nanocomposite Textile for Outdoor Personal Cooling," Adv. Mater., 30, 1802152 (2018), pp. 1-7.

Catalanotti et al., "The Radiative Cooling of Selective Surfaces," Sol. Energy, 17 (1975), pp. 83-89.

Chen et al., "Colored and Paintable Bilayer Coatings with High Solar-Infrared Reflectance for Efficient Cooling," Sci. Adv., 6, eaa25413 (2020), pp. 1-9.

Chen et al., "Radiative Cooling to Deep Sub-Freezing Temperatures through a 24-h Day-Night Cycle," Nat. Commun.,7, 13729 (2016), pp. 1-5.

Cheng et al., "Effect of Embedded Polydisperse Glass Microspheres on Radiative Cooling of a Coating," Int. J. Therm. Sci., 140 (2019), pp. 358-367.

Czapla et al., "Potential for Passive Radiative Cooling by PDMS Selective Emitters," In Proceedings of the ASME 2017 Heat Transfer Summer Conference, HT 2017, American Societ of Mechanical Engineers, 1, (2017), pp. 1-5.

Gentle et al., "Radiative Heat Pumping from the Earth Using Surface Phonon Resonant Nanoparticles," Nano Lett., 10 (2010), pp. 373-379.

Goldstein et al., "Sub-Ambient Non-Evaporative Fluid Cooling with the Sky," Energy, 2, 17143 (2017), pp. 1-7.

Granqvist et al., "Radiative Cooling to Low Temperatures: General Considerations and Application to Selectively Emitting SiO Films," J. Appl. Phys., 52 (1981), pp. 4205-4220.

Hossain et al., "A Metamaterial Emitter for Highly Efficient Radiative Cooling," *Adv. Optical Mater.* 3 (2015), pp. 1047-1051.

Hossain et al., "Radiative Cooling: Principles, Progresss, and Potentials," Advanced Science, 3, 1500360 (2016), pp. 1-10.

Huang et al., "Nanoparticle Embedded Double-Layer Coating for Daytime Radiative Cooling," Int. J. Heat Mass Transfer, 104 (2017), pp. 890-896.

Kou et al., "Daytime Radiative Cooling Using Near-Black Infrared Emitters," ACS Photonics, 4 (2017), pp. 626-630.

Leroy et al., "High-Performance Subambient Radiative Cooling Enabled by Optically Selective and Thermally Insulating Polyethylene Aerogel," Sci. Adv., 5, eaat9480 (2019), pp. 1-9.

Li et al., "Integration of Daytime Radiative Cooling and Solar Heating for Year-Round Energy Saving in Buildings," Nat. Commun. 11, 6101 (2020) pp. 1-9.

Li et al., A Radiative Cooling Structural Material, Science, 364 (2019), pp. 760-763.

Li et al., "Scalable and Hierarchically Designed Polymer Film as a Selective Thermal Emitter for High-Performance All-Day Radiative Cooling," Nat. Nanotechnol., 16 (2020), pp. 153-158.

Lloyd et al., "Microporous Membrane Formation via Thermally Induced Phase Separation. I. Solid-Liquid Phase Separation," J. Membr. Sci., 52 (1990), pp. 239-261.

Mandal et al., "Hierarchically Porous Polymer Coatings for Highly Efficient Passive Daytime Radiative Cooling," Science, 362 (2018), pp. 315-319.

Ono et al., "Self-Adaptive Radiative Cooling Based on Phase Change Materials," Opt. Express, 26, 18 (2018), pp. 1-11.

Raman et al., "Passive Radiative Cooling Below Ambient Air Temperature under Direct Sunlight," Nature, 515 (2014), pp. 540-544.

Rephaeli et al., "Ultrabroadband Photonic Structures to Achieve High-Performance Daytime Radiative Cooling," Nano Lett., 13 (2013), pp. 1457-1461.

Wu et al., "Passive Temperature Control Based on a Phase Change Metasurface," Sci. Rep. 8, 7684 (2018), pp. 1-6.

Wu et al., "The Design of Ultra-Broadband Selective Near-Perfect Absorber Based on Photonic Structures to Achieve near-Ideal Daytime Radiative Cooling," Materials and Design, 139, (2018), pp. 104-111.

Zhai et al., "Scalable-Manufactured Randomized Glass-Polymer Hybrid Metamaterial for Daytime Radiative Cooling," Science, 355 (2017), pp. 1062-1066.

* cited by examiner

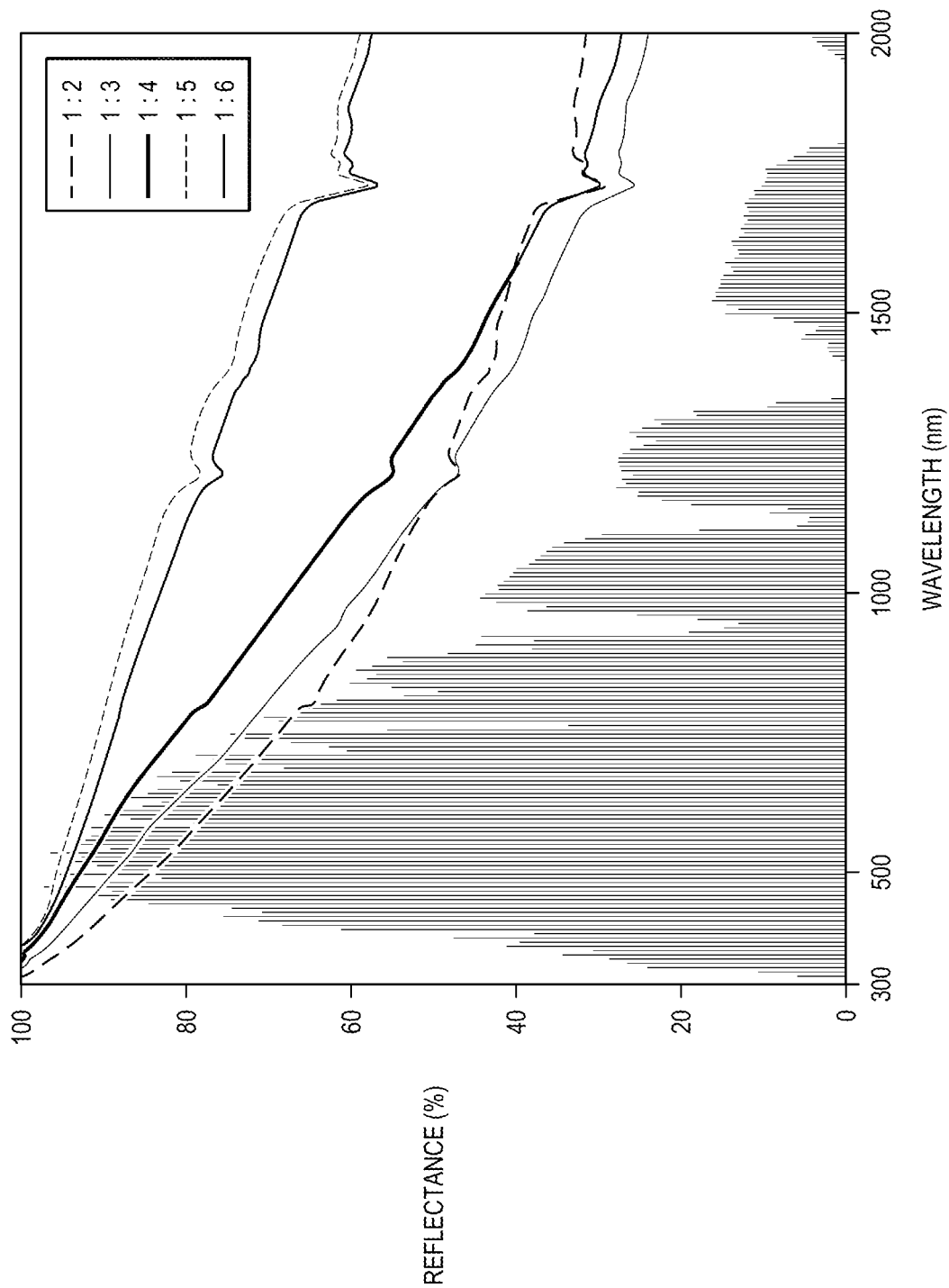

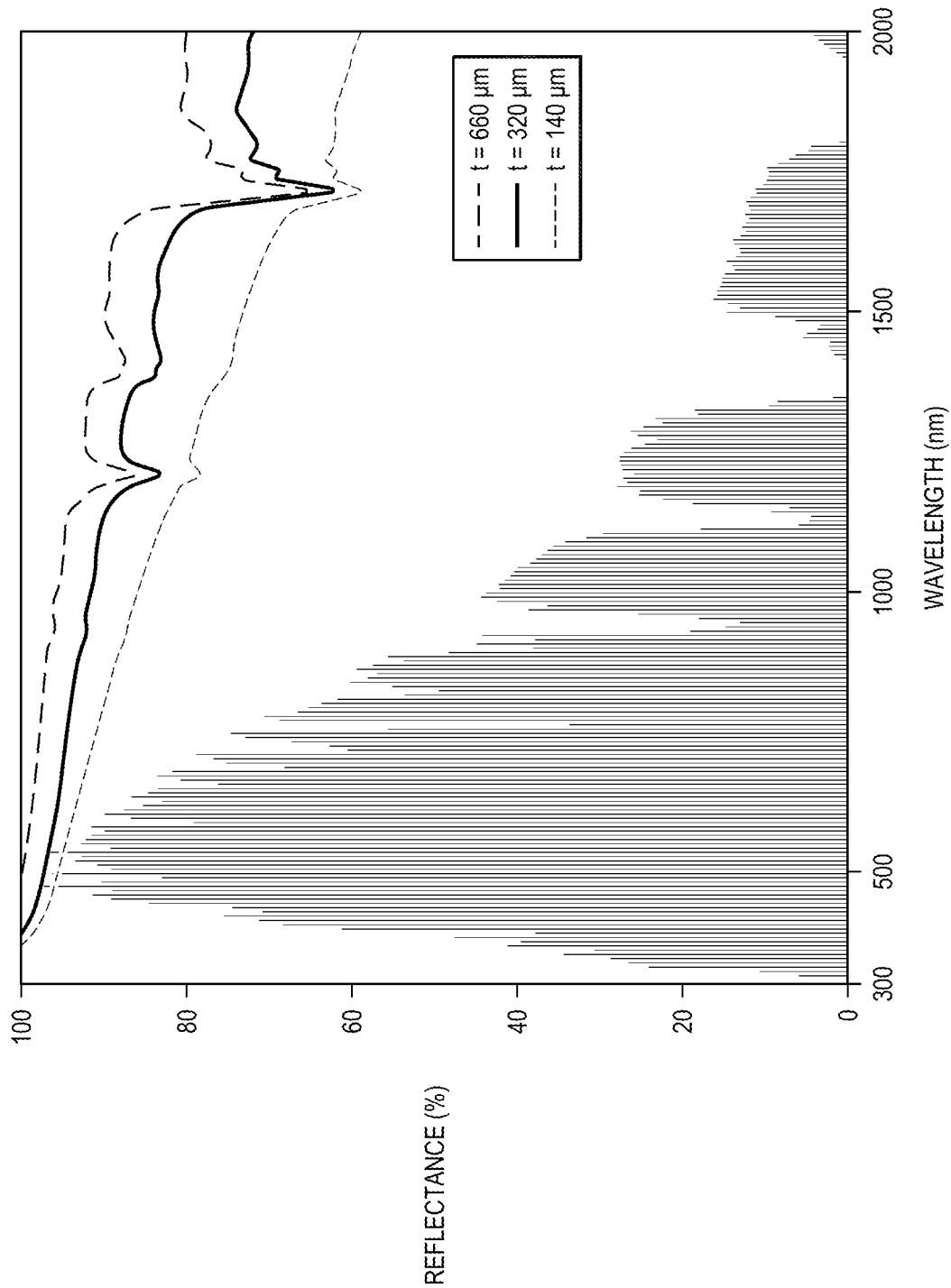

POROUS POLYMER COMPOSITE FOR DAYTIME RADIATIVE COOLING AND METHOD OF MAKING A POROUS POLYMER COMPOSITE

RELATED APPLICATION

The present patent document claims the benefit of priority under 35 U.S.C. 119(e) to U.S. Provisional Patent Application No. 63/219,969, which was filed on Jul. 9, 2021, and is hereby incorporated by reference in its entirety.

TECHNICAL FIELD

The present disclosure is related generally to cooling technologies and more specifically to a polymer composite designed to provide daytime radiative cooling.

BACKGROUND

Space cooling, which is widely used in modern society, consumes a significant amount of electricity and is expected to consume increasing amounts moving forward due to the likelihood of extreme weather in the next decades. Unfortunately, traditional vapor-compression-based cooling systems have a net heating effect on the global climate and may use refrigerants with a strong green-house effect. Recently, daytime radiative cooling, which seeks to achieve a subambient cooling effect even under intense solar irradiance, has attracted interest as an energy-saving and environmentally friendly strategy for space cooling applications. The objective of daytime radiative cooling is to reflect solar energy away from irradiated surfaces and simultaneously emit thermal radiation into the cold outer space (having a temperature of about 3K) through what is referred to as the atmospheric transparency window (e.g., wavelengths in a range from 8-13 μm). If a material or surface could be engineered such that the heat loss by thermal radiation could exceed the heat gain from solar absorption and parasitic heat, the temperature of the irradiated material or surface could be decreased by radiative cooling until reaching equilibrium at a subambient point.

BRIEF SUMMARY

A porous polymer composite for daytime radiative cooling includes a porous polymer matrix comprising a thermoplastic polymer and including a plurality of pores, and selectively emitting particles dispersed in the porous polymer matrix. When exposed to solar radiation, the porous polymer composite comprises an infrared emissivity of at least about 80% in a wavelength range of 8-13 μm and/or a solar reflectivity of at least about 80% in a wavelength range of 0.3-2 μm.

A method of making a porous polymer composite for daytime radiative cooling includes: mixing together a thermoplastic polymer, selectively emitting particles, and a polymer solvent to form a mixture; forming the mixture into a predetermined shape at a temperature sufficient to obtain a homogeneous solution of the thermoplastic polymer and the polymer solvent, with the selectively emitting particles distributed therein; cooling the predetermined shape, thereby inducing phase separation of the homogeneous solution into a liquid phase comprising the polymer solvent and a solid phase comprising the thermoplastic polymer and the selectively emitting particles; and extracting the liquid phase from the predetermined shape, thereby forming a porous polymer composite comprising a porous polymer matrix with the selectively emitting particles dispersed therein, where the porous polymer matrix comprises the thermoplastic polymer and includes a plurality of pores.

BRIEF DESCRIPTION OF THE DRAWINGS

FIGS. 10A and 10B show the solar reflectance of exemplary porous polymer matrices prepared at different polymer to polymer solvent ratios and having different thicknesses, respectively, as determined by UV-vis-NIR measurements.

DETAILED DESCRIPTION

In this disclosure, porous polymer composites capable of daytime radiative cooling that may be fabricated using a scalable and inexpensive process are described. High solar reflectivity may be achieved from the composites by tuning the porous structure of the polymer matrix, which eliminates the need for expensive vacuum deposition of a reflective metal layer, as employed in other approaches. Infrared emissivity may be independently controlled by manipulating the concentration of selectively emitting particles dispersed in the polymer matrix. As demonstrated below, porous polymer composites including selectively emitting particles in a thermoplastic polymer matrix may exhibit high solar reflectivity (>96%) in the wavelength range of 0.3-2 µm along with high infrared emissivity (>90%) in the atmospheric transparency window of 8-13 µm. Thermal measurements under direct sunlight (>700 W/m$^2$) show that exemplary porous polymer composites can achieve a subambient temperature drop up to 6.1° C. and a cooling power of 85 W/m$^2$. Moreover, due to the thermoplastic nature of the polymer matrix, the porous polymer composites can be readily formed into different shapes using commercially available processing techniques, such as molding, extrusion, and 3D printing.

Figure 1:
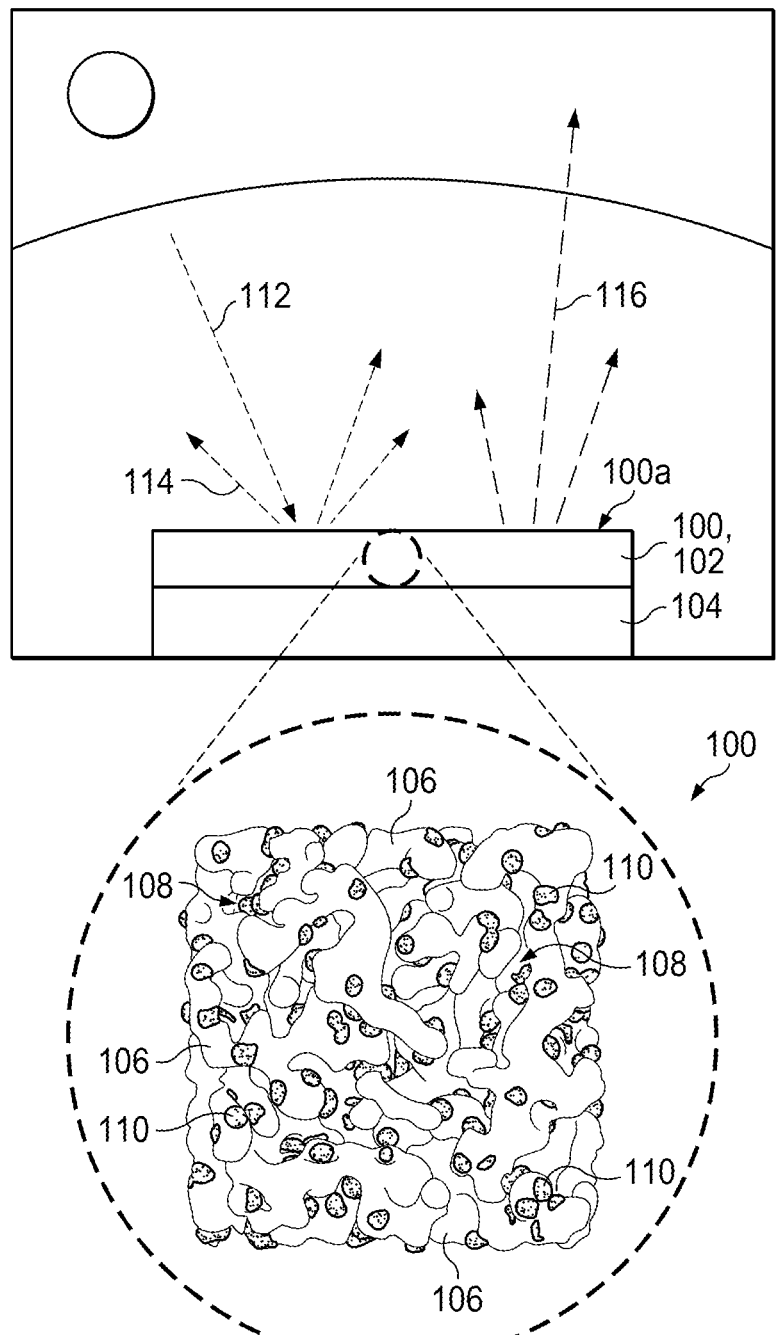
FIG. 1 shows a schematic of an exemplary porous polymer composite applied to a solar-facing surface to be cooled by daytime radiative cooling.

FIG. 1 shows a schematic of an exemplary porous polymer composite 100 for daytime radiative cooling. In this example, the porous polymer composite 100 has the form of a film 102 applied to a flat surface 104; however, due to the flexible manufacturing process, as discussed below, the porous polymer composite 100 may have any desired shape. The composite includes a porous polymer matrix 106 comprising a thermoplastic polymer and including a plurality of pores 108, and selectively emitting particles 110 are dispersed in the polymer matrix 106. As used in this disclosure, the term "selectively emitting particles" 110 refers to particles capable of emitting infrared radiation, particularly within the wavelength range from 8 µm to 13 µm. Preferably, the pores 108 exhibit a range of sizes (e.g., widths or diameters) in the range from about 200 nm to about 4 microns to promote scattering instead of transmission of ultraviolet, visible and near-infrared radiation, thereby enabling reflection of incident sunlight. The pores 108 may be partially or completely interconnected. Upon exposure to solar radiation 112, the polymer composite 100 may exhibit a solar reflectivity 114 of at least about 80% in a wavelength range of 0.3-2 µm due to the presence of the pores 108 and/or an infrared emissivity 116 of at least about 80% in a wavelength range of 8-13 µm due to the presence of the selectively emitting particles 110. The thermoplastic polymer may comprise polyethylene, for example, and the selectively emitting particles 110 may comprise ceramic particles, such as silicon oxide (e.g., SiO$_2$), silicon nitride, barium sulfate, and/or zirconium oxide particles. Notably, it is possible to achieve simultaneously high solar reflectivity 114 and selective infrared emissivity 116 from the porous polymer composite 100 without requiring an additional reflective metal layer, as would be expected based on previous work.

Figure 2:
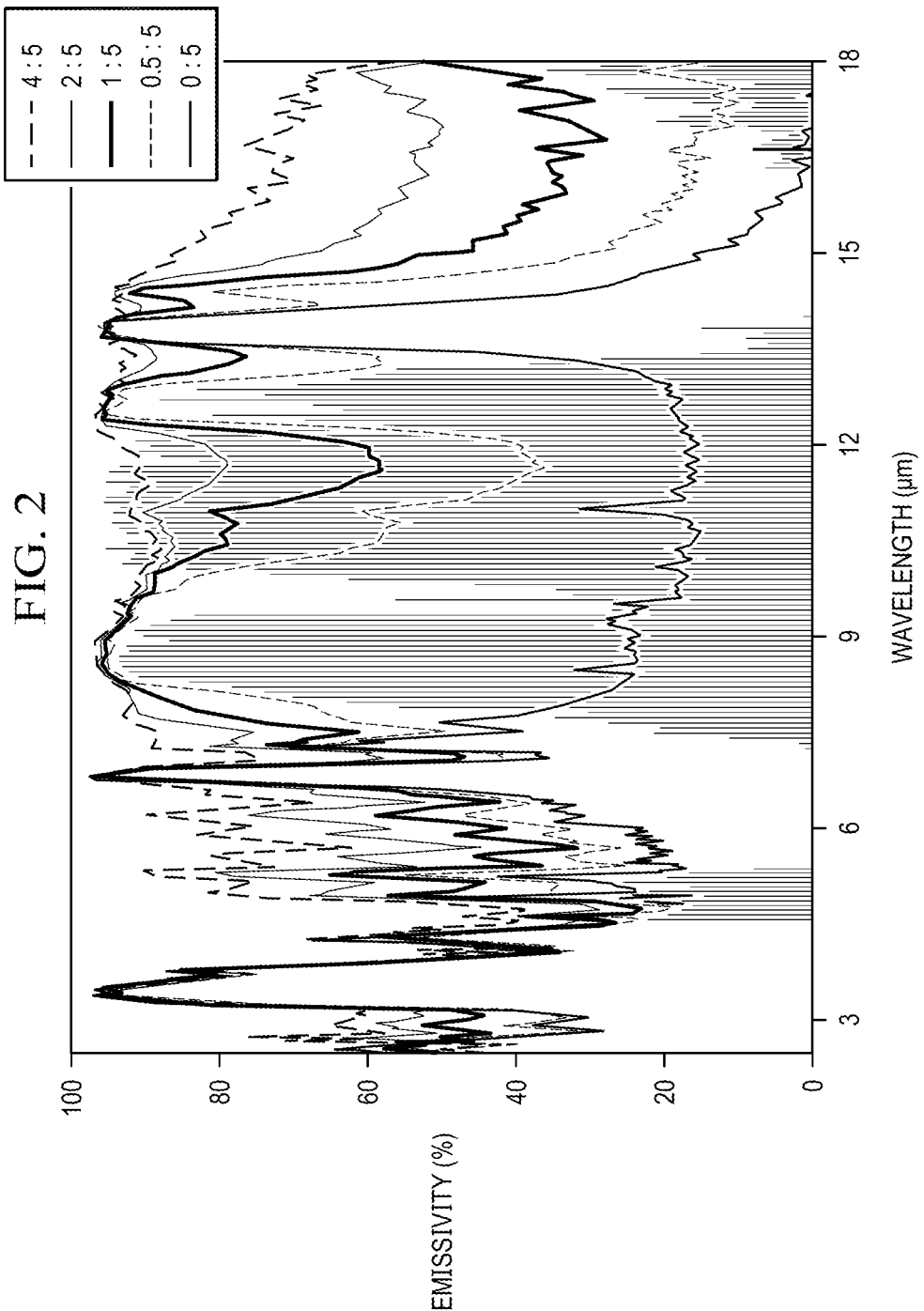
FIG. 2 shows emissivity versus wavelength for porous polymer composites including different weight ratios of selectively emitting particles to thermoplastic polymer as determined by Fourier transform infrared (FTIR) emissivity measurements, where the gray shaded area represents the atmospheric transparency window.

A weight ratio of the selectively emitting particles 110 to the thermoplastic polymer may be at least about 1:5 or at least about 2:5, and may be as high as or higher than 4:5. Porous polymer composites 100 including relatively high concentrations of selectively emitting particles 110 (e.g., in the weight ratio range from 2:5 to 4:5, or from 3:5 to 4:5) may exhibit high emissivity over the wavelength range from 8 µm to 13 µm. This is supported by the emissivity data of FIG. 2 obtained from a porous polymer composite 100 comprising a polyethylene matrix with silicon oxide particles dispersed therein. At a weight ratio of at least about 2:5 (or from about 2:5 to about 4:5), the infrared emissivity is at least about 75 or 80% over the entire range from 8 µm to 13 µm. With increasing amount of selectively emitting particles 110, the infrared emissivity of the polymer composite 100 in the wavelength region of 8-13 µm increases. At the weight ratio of 4:5, the infrared emissivity is at least 85% over the entire range and at some wavelengths is higher than 90%. The emissivity data were obtained using a Fourier transform infrared (FTIR) spectrometer (Thermo Nicolet Nexus 670 FTIR) with a diffuse gold integrating sphere (PIKE Technologies).

The selectively emitting particles 110 may have a nominal size (e.g., width or diameter) in a range from about 10 nm to about 10 microns; however, tests suggest that particle size does not have a significant influence on emissivity. With a suitable particle concentration and film thickness, as discussed below, particles 110 of arbitrary sizes seem to be sufficient to enable high mid-infrared emissivity.

Figure 3:
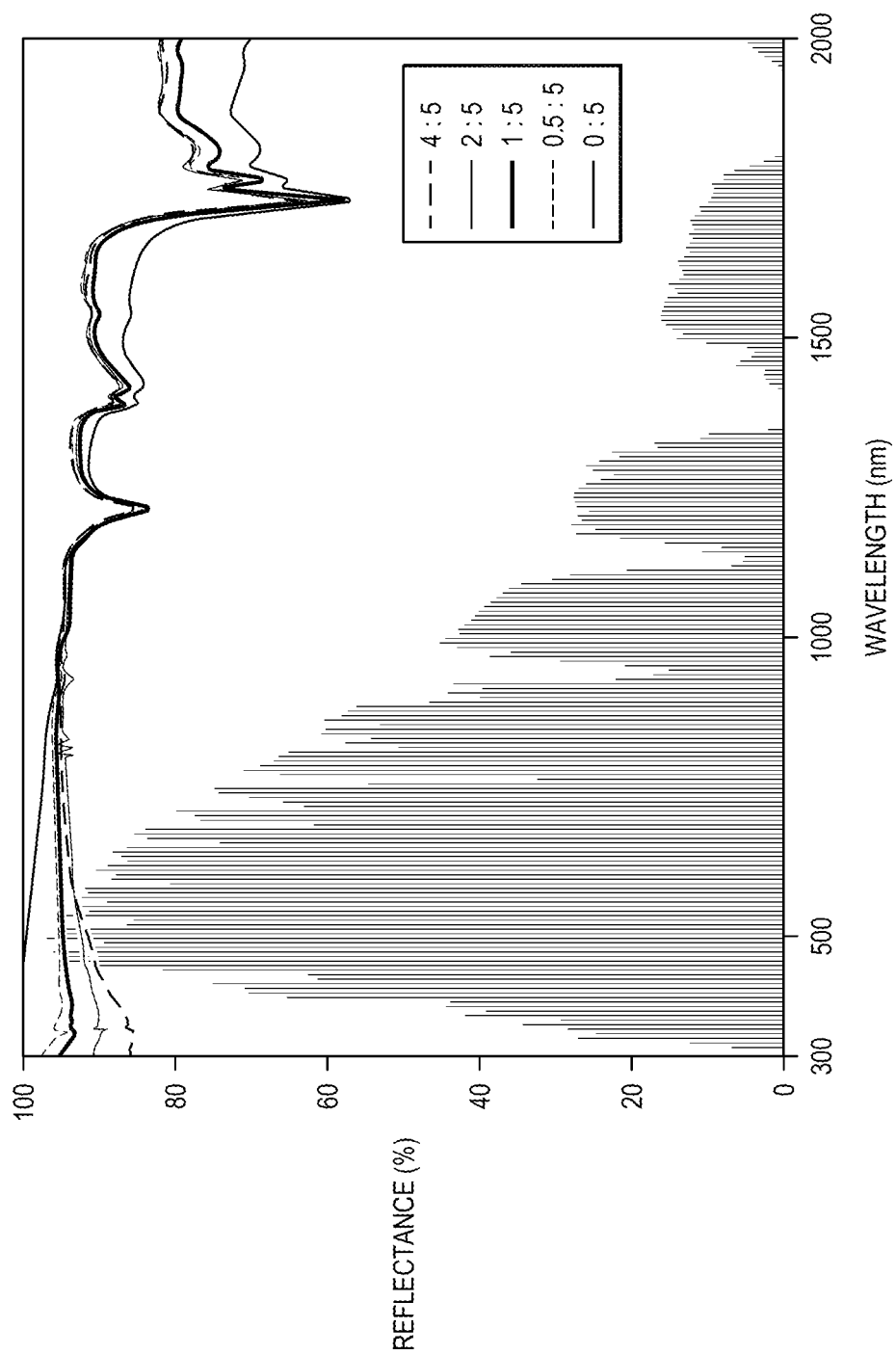
FIG. 3 shows solar reflectance versus wavelength for porous polymer composites including different weight ratios of selectively emitting particles to thermoplastic polymer as determined by UV-vis-NIR reflectance measurements, where the shaded area represents the air mass (AM) 1.5 G solar spectra.

Notably, the addition of selectively emitting particles 110 such as silicon oxide particles to the porous polymer matrix 100 has little influence on the overall solar reflectance, leading to only a slight decrease in the ultraviolet region, as shown in FIG. 3. However, this slight decrease of the solar reflectance in the ultraviolet region with a high concentration of silicon oxide particles may be compensated for without diminishing the infrared emissivity by introducing a gradient in concentration of the selectively emitting particles. For example, as in the experiment described below, the concentration of selectively emitting particles 110 may increase (or decrease) in a direction away from a solar-facing surface 100a of the porous polymer composite 100, where a "solar-facing surface" may be understood to be a surface positioned to be able to receive solar radiation. The gradient may take the form of a continuous gradient (e.g., a linear or exponential increase or decrease) or a step-function gradient. The selectively emitting particles 110 may also or alternatively be uniformly dispersed in the polymer matrix 106.

Figure 4:
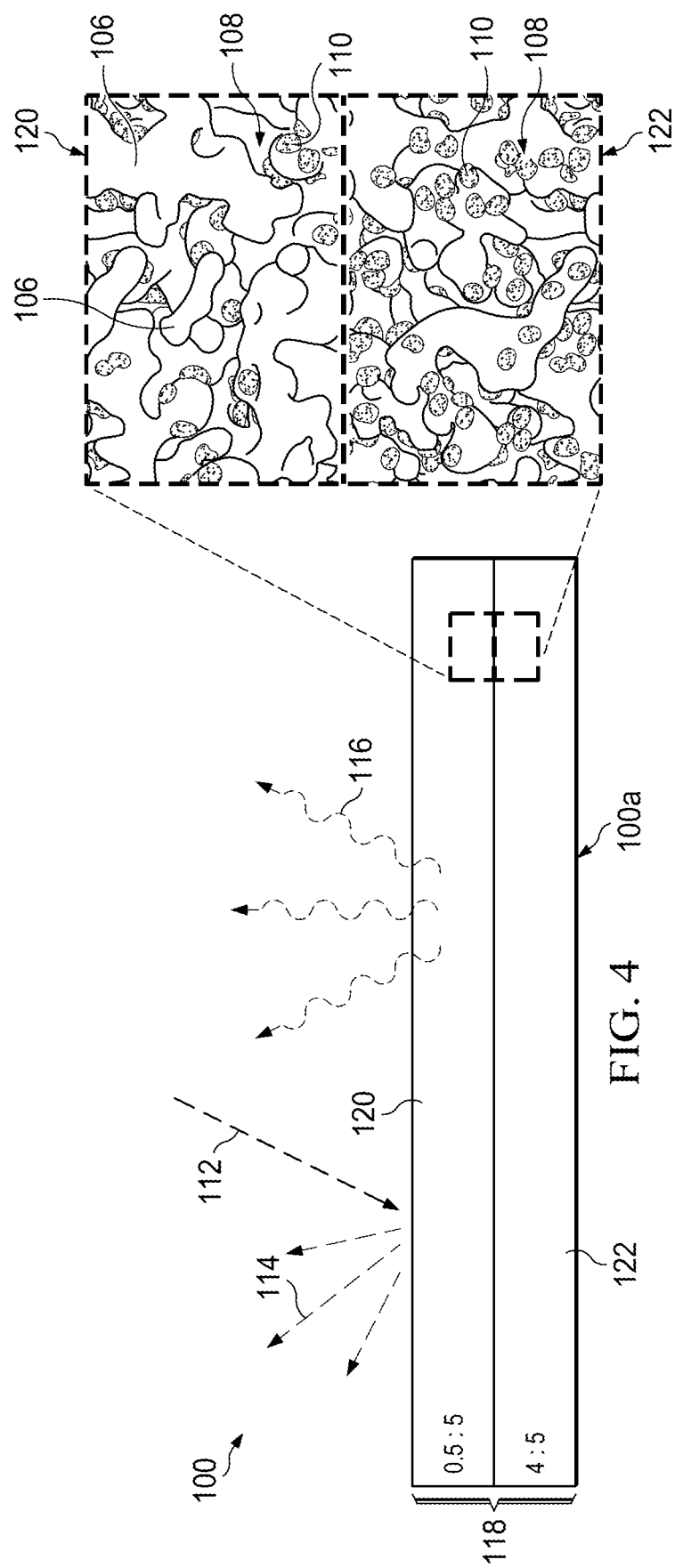
FIG. 4 shows a schematic of an exemplary porous polymer composite having a gradient in concentration of the selectively emitting particles.

An exemplary porous polymer composite 100 including a concentration gradient of selectively emitting particles 110 may be fabricated using the simple method described below. The porous polymer composite 100 may have the form of a multilayer film where the multilayer film includes fewer selectively emitting particles in the top layer than in the bottom layer, as shown in FIG. 4. For example, the top layer may include a weight ratio of selectively emitting particles to thermoplastic polymer of 0.5:5, compared to a weight ratio of 4:5 in the bottom layer, where the particles are uniformly distributed within each layer, and thus the gradient in concentration may be described as a step-function gradient. Such a gradient structure may reduce or eliminate the slight reflectance decrease in the UV region, as shown in FIG. 3.

Figure 5A:
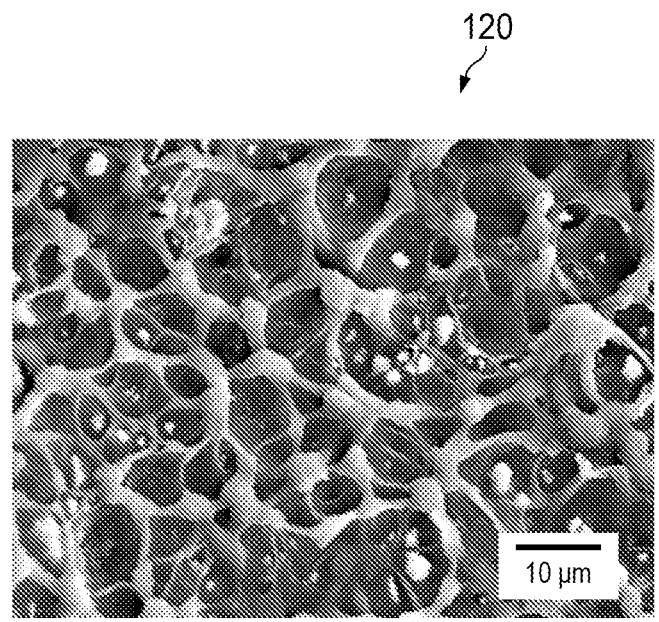
FIGS. 5A and 5B show scanning electron microscopy (SEM) images of the top and bottom layers, respectively, of a porous polymer composite fabricated to have a gradient structure, as shown schematically in FIG. 4.
Figure 5B:
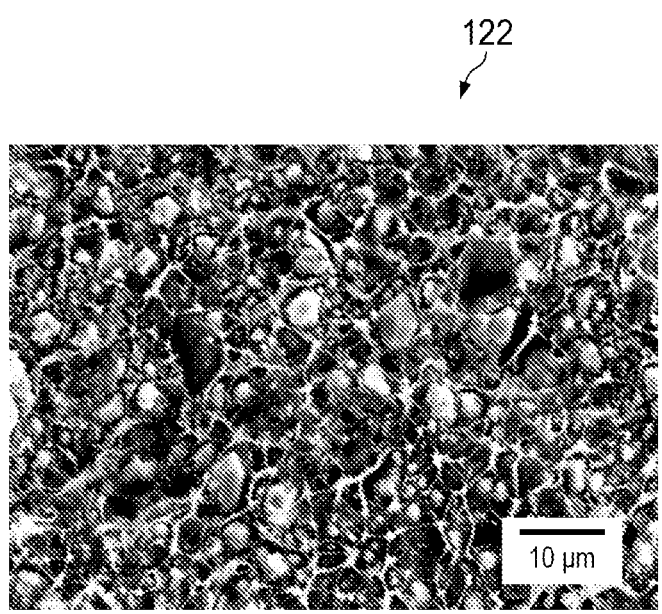
Figure 6:
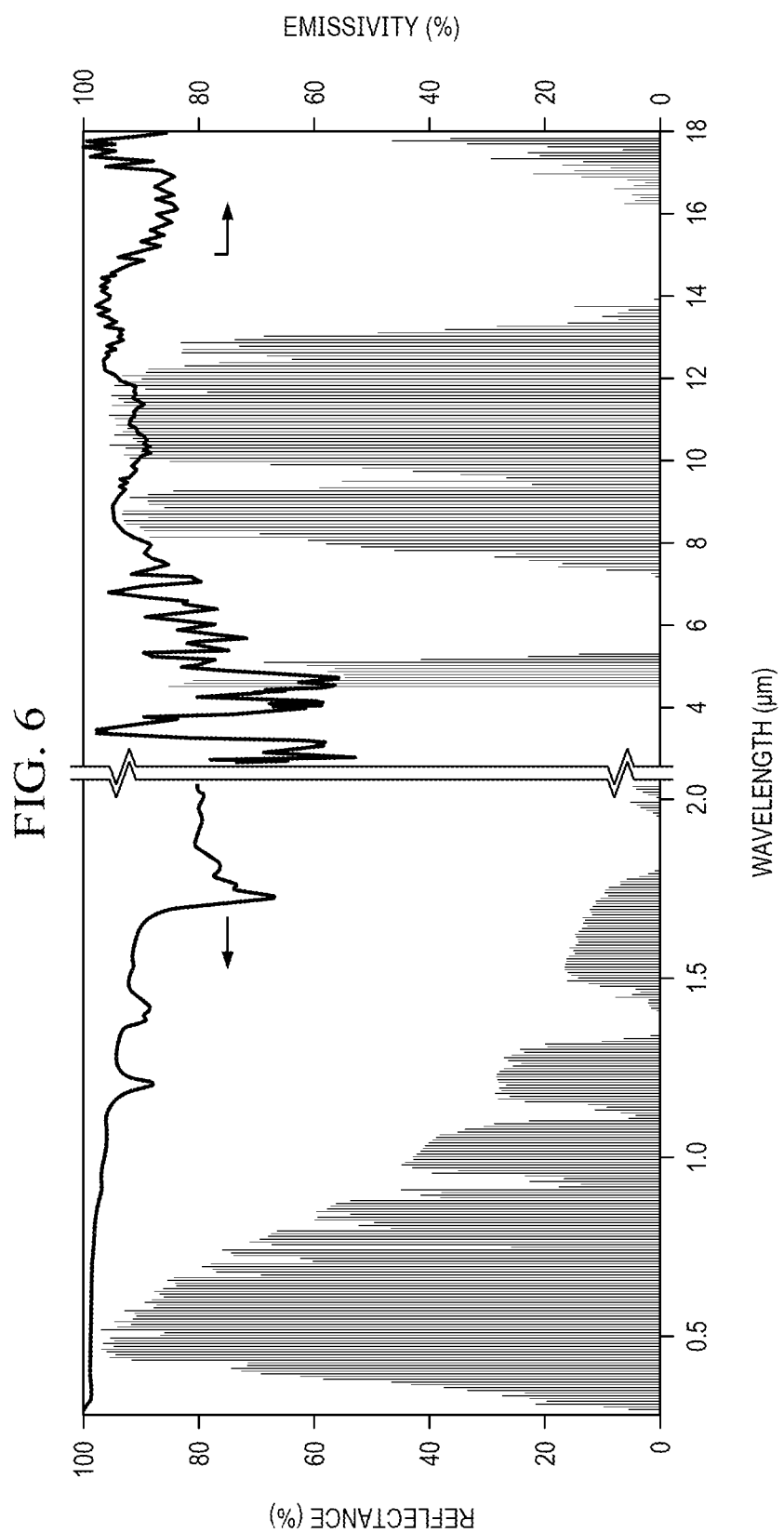
FIG. 6 shows solar reflectance and infrared emissivity as a function of wavelength for the porous polymer composite of FIGS. 5A and 5B.

A porous polymer composite 100 having the gradient structure of FIG. 4 was fabricated experimentally as a multilayer film 118 of 840 µm in thickness including a 280 µm-thick top layer 120 and a 560 µm-thick bottom layer 122, where the selectively emitting particles 110 comprise SiO$_2$. A ratio of the thermoplastic polymer, which is polyethylene in this example, to the paraffin oil employed for fabrication was kept constant at 1 g to 5 mL, which enabled the entire multilayer film 118 to exhibit an interconnected porous structure. The cross-sectional morphology of the as-fabricated porous polymer composite 100 is shown by scanning electron microscopy (SEM) images in FIGS. 5A (top layer 120) and 5B (bottom layer 122). It is evident that the top layer 120 has a lower concentration of $SiO_2$ particles than the bottom layer 122. Within each layer, the $SiO_2$ particles are uniformly dispersed within the porous polymer matrix with little to no agglomeration. The pore sizes are mainly distributed in the range of 200 nm to 2 μm and are thus comparable to the wavelengths of ultraviolet, visible, and near-infrared radiation, allowing for strong Mie scattering effects. Generally speaking, the pore sizes may lie in the range from about 10 nm to about 5 μm. Characterization results in FIG. 6 demonstrate that the solar reflectance in the wavelength range of 0.3-2 μm and infrared emissivity in the wavelength range of 8-13 μm for a porous polymer composite with a concentration gradient can reach high values of at least 96% and greater than 90%, respectively.

In some examples, a solar-facing surface 100a of the porous polymer composite 100 may include a pattern of raised features 130 to impart hydrophobicity and self-cleaning properties to the surface, which may be described as a patterned surface. The pattern of raised features 130 may comprise an ordered (regular) or irregular array of raised features 130, as shown for example in FIG. 14, which is discussed further below. The raised features 130 may comprise square pillars, round pillars, square pyramids, triangular pyramids, or another protruding shape. In some examples, the raised features 130 may have a height in a range from about 40-100 microns, a side length or width in a range from about 10-150 microns, and/or a spacing between adjacent raised features 130 in a range from about 20-120 microns. Advantageously, due to the presence of the pattern of raised features 130, the patterned surface may exhibit a water contact angle of greater than 150° and thus may be described as superhydrophobic.

It is also contemplated that the porous polymer composite 100 may further include photocatalytic particles on or embedded in the surface of porous polymer matrix 106. Photocatalytic particles comprising zinc oxide and/or titanium dioxide, for example, may impart antibacterial properties to the composite 100. When exposed to sunlight, the photocatalytic particles may facilitate chemical reactions that lead to antimicrobial disinfection. Typically, a relatively small concentration of the photocatalytic particles is included at or near the surface of the matrix 106 to achieve the antibacterial effect. For example, a mass concentration of the photocatalytic particles to the surface of the thermoplastic polymer matrix 106 may lie in a range from about 1 $mg/cm^2$ to about 4 $mg/cm^2$. The size of the photocatalytic particles may range from 100 nm to about 5 microns.

A daytime radiative cooling system based on the above-described porous polymer composite 100—in the form of a film, textile (e.g., woven or nonwoven fabric), or another shape—may be positioned on and/or attached to a solar-facing surface of an object or product to be cooled. As indicated above, a "solar-facing surface" may be understood to be a surface positioned to be able to receive solar radiation, as shown schematically in FIG. 1. For example, the solar-facing surface may part of an external surface of a building, roof, vehicle, tent, or other (outdoor) structure. In some examples, the solar-facing surface may be part of an apparel item, such as a jacket or hat. Daytime radiative cooling presents an opportunity to combat global warming by passively cooling such structures via reflection of sunlight and ejection of heat through the infrared atmospheric window into outer space.

Figure 8A:
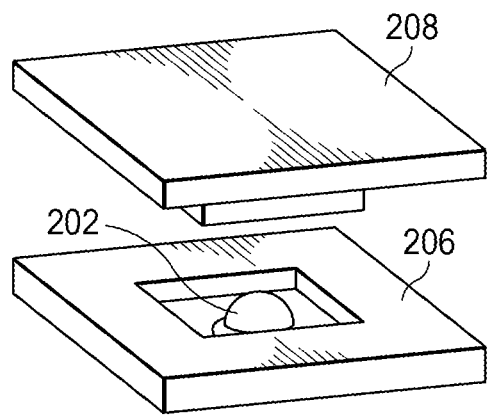
FIGS. 8A and 8B are schematics of exemplary forming processes for the porous polymer composites, including compression molding and 3D printing, respectively.
Figure 13:
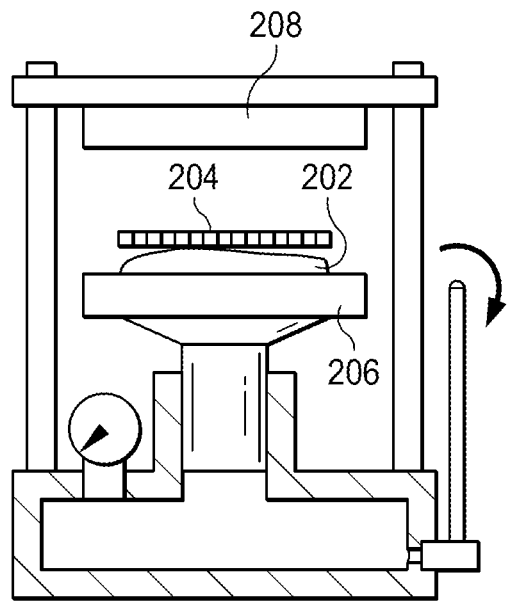
FIG. 13 is a schematic of a compression molding process to produce a porous polymer composite having a patterned surface.

As indicated above, a simple and inexpensive method of making the porous polymer composite 100 described in this disclosure has been developed. The method includes mixing together a thermoplastic polymer, selectively emitting particles (e.g., silicon oxide or other ceramic particles), and a polymer solvent to form a polymer mixture, and forming the polymer mixture into a predetermined shape at a temperature sufficient to obtain a homogeneous solution of the thermoplastic polymer and the polymer solvent, with the selectively emitting particles distributed therein. A weight ratio of the selectively emitting particles to the thermoplastic polymer in the homogeneous solution may lie be at least about 1:5 and as high as about 4:5, or higher (e.g., the weight ratio may lie in a range from about 2:5 to about 4:5). The polymer mixture may be formed into the predetermined shape (e.g., film, fiber, or arbitrary 3D shape) by, for example, molding, spinning, extrusion, and/or 3D printing. In some shape forming processes, photocatalytic particles may be incorporated near the surface of the predetermined shape, e.g., as a uniform coating to a film surface. For example, before molding, a layer of the photocatalytic particles may be spread onto the surface of the polymer mixture; upon molding, the particles may be embedded within the surface. Molding may involve compressing the polymer mixture 202 (with or without the layer of photocatalytic particles) between platens 206,208 of a molding apparatus, as illustrated in FIG. 8A, to form the predetermined shape (e.g., a film). 3D printing may entail extruding the polymer mixture 202 from a nozzle 210 moving relative to a deposition surface 212 to form the predetermined shape (e.g., a 3D object formed layer by layer). In examples where a solar-facing surface 100a of the porous polymer composite 100 includes a pattern of raised features 130, molding, 3D printing, or another suitable method may be employed to create the pattern. For example, referring to FIG. 13, a metal mesh 204 may be placed between a surface of the polymer mixture 202 and a heated platen 208 of a compression molding apparatus, and the heated platen 208 may be pressed against the metal mesh 204 to force the metal mesh 204 into the surface of the polymer mixture 202. Thus, a pattern of raised features 130 may be imprinted into the surface. The openings in the metal mesh 204 may define the shape, size and spacing of the raised features 130.

After the polymer mixture is formed into the predetermined shape, the polymer mixture/predetermined shape is then cooled, thereby inducing phase separation of the solution into a liquid phase comprising the polymer solvent and a solid phase comprising the thermoplastic polymer and the selectively emitting particles. Ultimately, the liquid phase is extracted from the predetermined shape to form a porous polymer composite 100 comprising a porous polymer matrix 106 with the selectively emitting particles 110 dispersed therein, as shown in FIG. 1; the porous polymer matrix 106 comprises the thermoplastic polymer and includes a plurality of pores 108. The extracting may entail immersing the predetermined shape obtained in the forming step into an organic solvent such as methylene chloride, hexane, or ethanol to dissolve the liquid phase, and then removing the predetermined shape from the organic solvent. The resulting pores 108 may be interconnected and/or may have a width or diameter in a range from about 10 nm to about 5 microns, from about 200 nm to about 4 microns, or from about 200 nm to about 2 microns, since pores 108 within these size ranges may promote scattering and reflection of the desired solar wavelengths. In examples where the predetermined shape is a fiber (e.g., produced by extrusion or spinning), a plurality of the fibers may be woven together or otherwise assembled to form a woven or nonwoven fabric comprising the porous polymer composite 100.

The porous polymer composite 100 formed as described above may have any of the characteristics or properties described in this disclosure. For example, the selectively emitting particles 110 may comprise ceramic particles (e.g., silicon oxide) and may also or alternatively have a nominal size in a range from about 10 nm to about 10 microns. The thermoplastic polymer 106 may comprise polyethylene. The polymer composite 100 may exhibit an infrared emissivity 116 of at least about 80% in a wavelength range of 8-13 μm and/or a solar reflectivity 114 of at least about 80% in a wavelength range of 0.3-2 μm.

Figure 7:
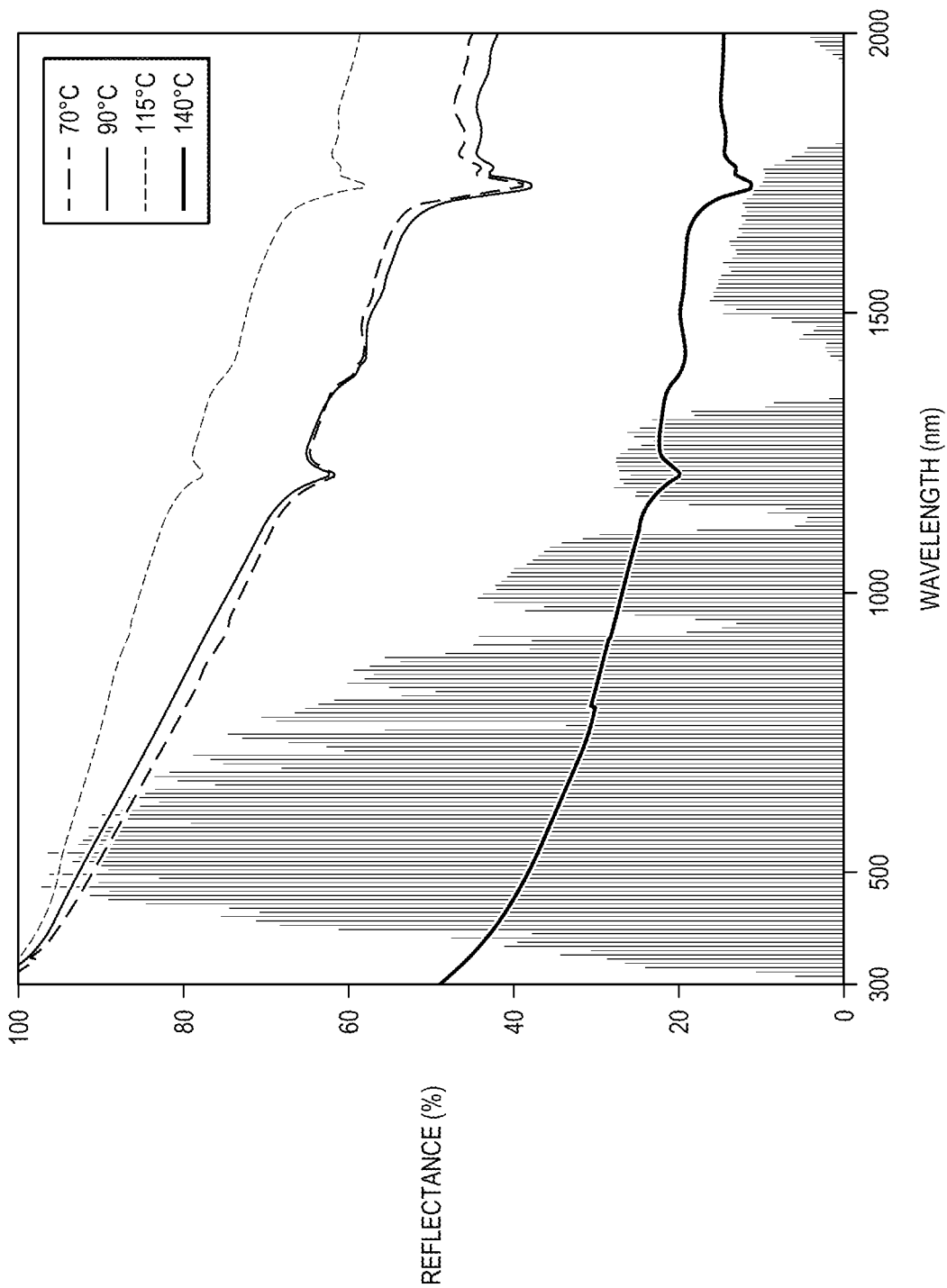
FIG. 7 shows solar reflectance versus wavelength for porous polymer composites formed at different temperatures.

The temperature at which the homogenous solution is formed into the predetermined shape may be at least about 110° C., at least about 115° C., and as high as 120° C., particularly for the example where polyethylene is the thermoplastic polymer. If the temperature is too low, the thermoplastic polymer and the polymer solvent (e.g., oil, such as paraffin oil) cannot sufficiently mix into a homogeneous, single-phase solution, which is important for inducing phase separation during the cooling step. If, on the other hand, the temperature is too high, the polymer solvent may diminish due to fast evaporation, which can impede the formation of the porous structure upon extraction of the polymer solvent. This is illustrated by the data of FIG. 7, which show significant decreases in reflectance when the temperature used for forming is much lower (e.g., 70° C. or 90° C.) or much higher (e.g., 140° C.) than the optimal temperature of 115° C. or temperature range of 110-120° C. It is noted that the initial formation of the mixture may occur at a higher temperature (e.g., 180-200° C.), as in the example described below.

During the forming process, where a predetermined shape is obtained by, for example, molding, extrusion, and/or 3D printing, a gradient in concentration of the particles may be obtained in the formed shape by utilizing mixtures including different particle concentrations. For example, during a 3D printing process, a homogeneous solution prepared from a first polymer mixture may be extruded through a nozzle and deposited as a continuous filament on a substrate to form a first layer, and then a homogeneous solution prepared from a second polymer mixture including a different amount of selectively emitting particles than the first mixture may be extruded and deposited as a continuous filament on the first layer, such that a second layer formed on the first layer includes a lower or higher concentration of the particles. Generally speaking, multilayer films including from two to ten or more layers, such as the multilayer film 118 illustrated in FIG. 4, may be formed by molding, extrusion, 3D printing or another method where each layer includes a different concentration of the selectively emitting particles, thereby forming an increasing or decreasing gradient in particle concentration in a direction away from the solar-facing surface of the multilayer film.

Figure 8B:
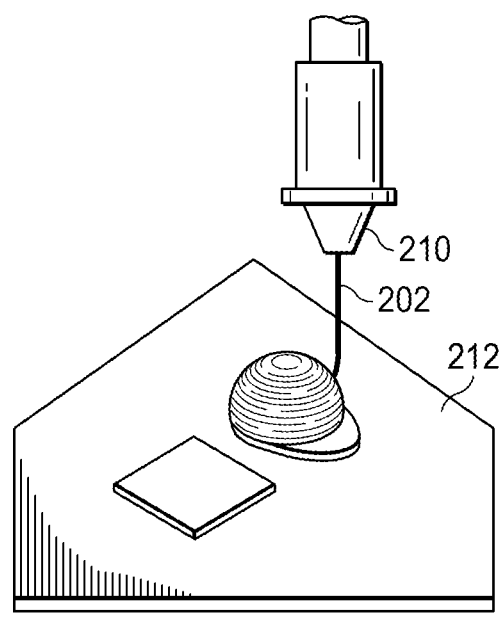
Figure 9A:
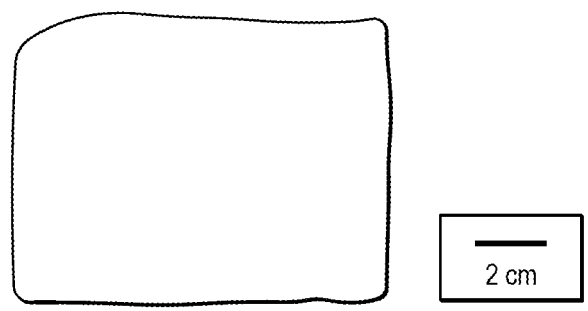
FIG. 9A shows a porous polymer composite formed by compression molding.
Figure 9B:
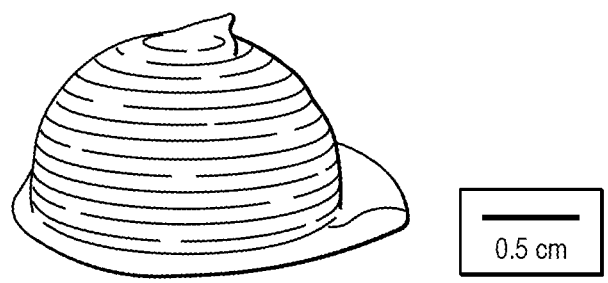
FIGS. 9B and 9C show porous polymer composites of different shapes formed by 3D printing.
Figure 9C:
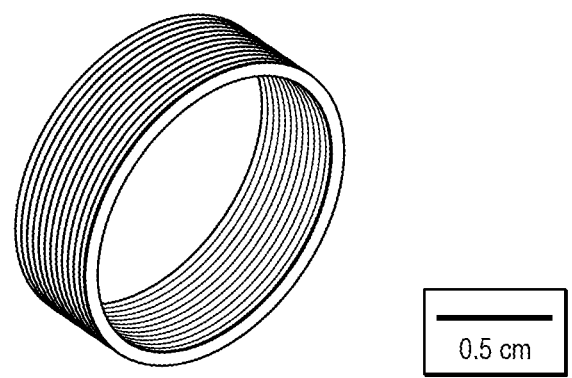

An experimental example of fabrication of a porous polymer composite is described here. High-density polyethylene (PE) pellets (HDPE, melt index 2.2 g/10 min, Sigma-Aldrich), ultrahigh molecular weight PE powder (UHMWPE, Alfa Aesar), and $SiO_2$ particles (<10 μm in particle size, Sigma-Aldrich) are mixed in paraffin oil (light, Fisher Chemical) at 180-200° C. for 30 min using an overhead stirrer. After sufficient stirring, a uniform mixture is obtained, which can be further used to form a predetermined shape by any number of different forming techniques, such as compression molding and 3D printing, as illustrated in FIGS. 8A and 8B, respectively. During the forming process, the mixture is heated to a suitable temperature as discussed above at which it softens and forms a homogenous, single-phase solution, and then is cooled to room temperature after the desired shape is attained. After solidification, demixing of the homogeneous solution occurs, and separation into a polymer-rich solid phase and an oil-rich liquid phase occurs due to thermally-induced phase separation. Finally, the paraffin oil is extracted by methylene chloride (99.99%, Fisher Chemical), and an interconnected porous polymer network is created. It should be noted that, in addition to its compatibility with conventional polymer processing techniques for the large-scale fabrication of thin films, the method enables the use of compression molding and/or 3D printing to construct complex geometric structures with a radiative cooling capability for the first time, as shown for example in FIGS. 9A-9C. Considering the increasing importance of 3D printing, especially in the construction and architecture industry, this could provide the advantages of flexible customization, rapid production, and cost reduction to broaden the practical application of radiative cooling technologies in buildings.

The inventors have recognized that the solar reflectance of the porous polymer composite may controlled and optimized by manipulating the fabrication conditions, such as the ratio of the thermoplastic polymer to the polymer solvent in the mixture, the heating temperature as discussed above, and the thickness of the film or other shape comprising the composite. FIGS. 10A and 10B show the solar reflectance of the porous polymer matrix measured using an ultraviolet-visible-near-infrared (UV-vis-NIR) spectrometer (Cary 5000, Agilent) with an integrating sphere (DRA 2500, Agilent). In order to elucidate the effect of the porous polymer matrix for attaining high solar reflectance, selectively emitting particles were not added into the mixture for these samples.

It is found that the overall solar reflectance first increases and then decreases as the volume of the polymer solvent increases relative to the amount of thermoplastic polymer, as shown in FIG. 10A, reaching an optimal value at a thermoplastic polymer-to-polymer solvent ratio (specifically, the ratio of the weight of the thermoplastic polymer in grams to the volume of the polymer solvent in milliliters; in this case the ratio PE:oil) in a range from 1:5 to 1:6. This is because the ratio of the thermoplastic polymer to the polymer solvent directly influences the solid-liquid phase separation upon cooling from the homogeneous solution, thus determining the final pore size and distribution after oil (polymer solvent) extraction. Generally speaking, the thermoplastic polymer-to-polymer solvent ratio may be at least about 1:2 and as high as about 1:6, or higher. In the examples of FIG. 10A, the weight ratio of the HDPE to the UHMWPE is fixed at 4:1, but this may not be required.

FIG. 10B illustrates that the solar reflectance may also or alternatively be enhanced by increasing the thickness of the film or other formed shape of the porous polymer composite. Preferably, the polymer composite has a thickness of at least about 100 μm, at least about 320 μm, and in some examples the thickness may be at least about 660 μm. At a thickness of 660 μm, an exemplary porous polymer film fabricated with a heating temperature of 115° C. and a ratio PE:oil of 1:5 achieves a high solar reflectance of over 96% (normalized over the solar spectrum in the wavelength range of 300 nm to 2000 nm).

Figure 11:
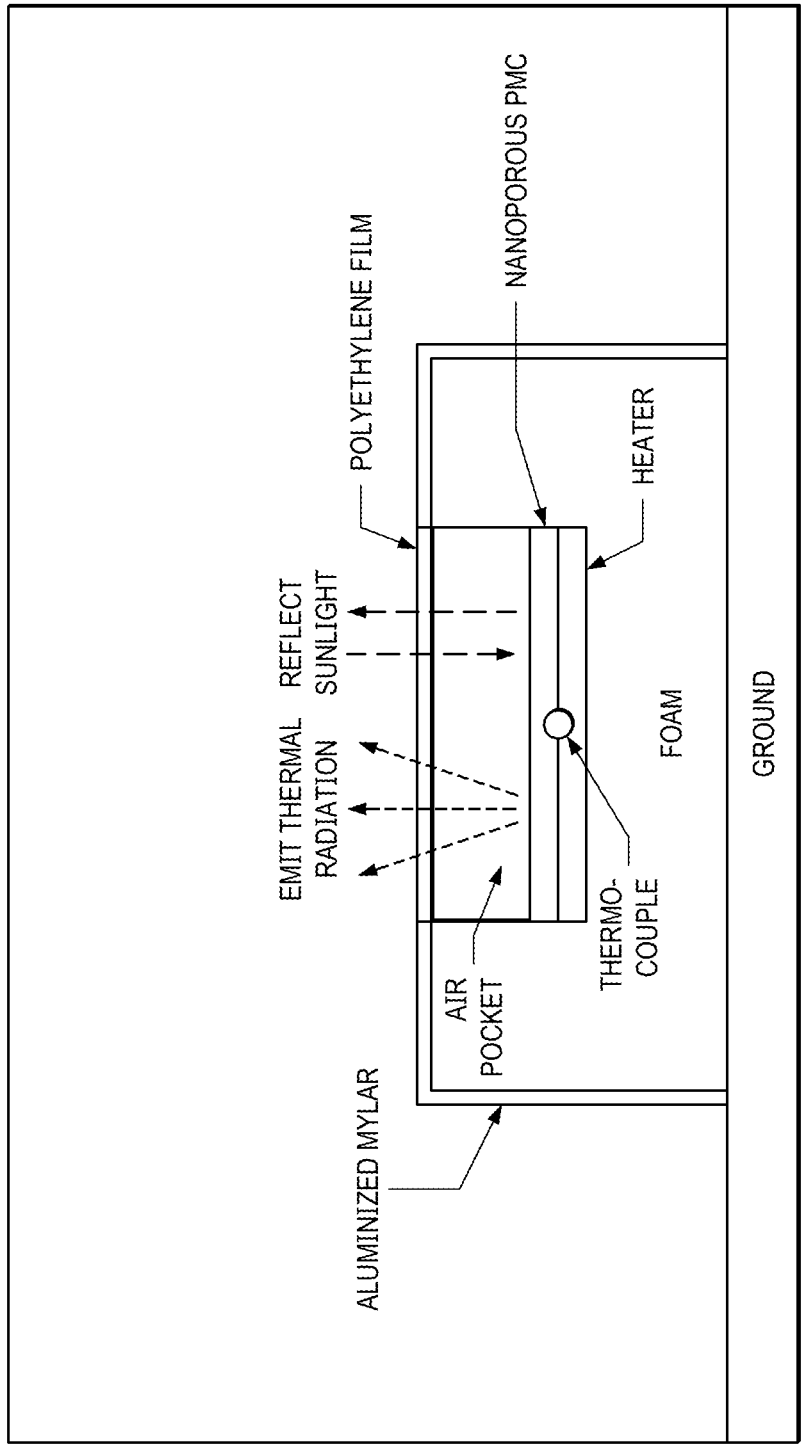
FIG. 11 shows the measurement setup for daytime radiative cooling experiments.
Figure 12A:
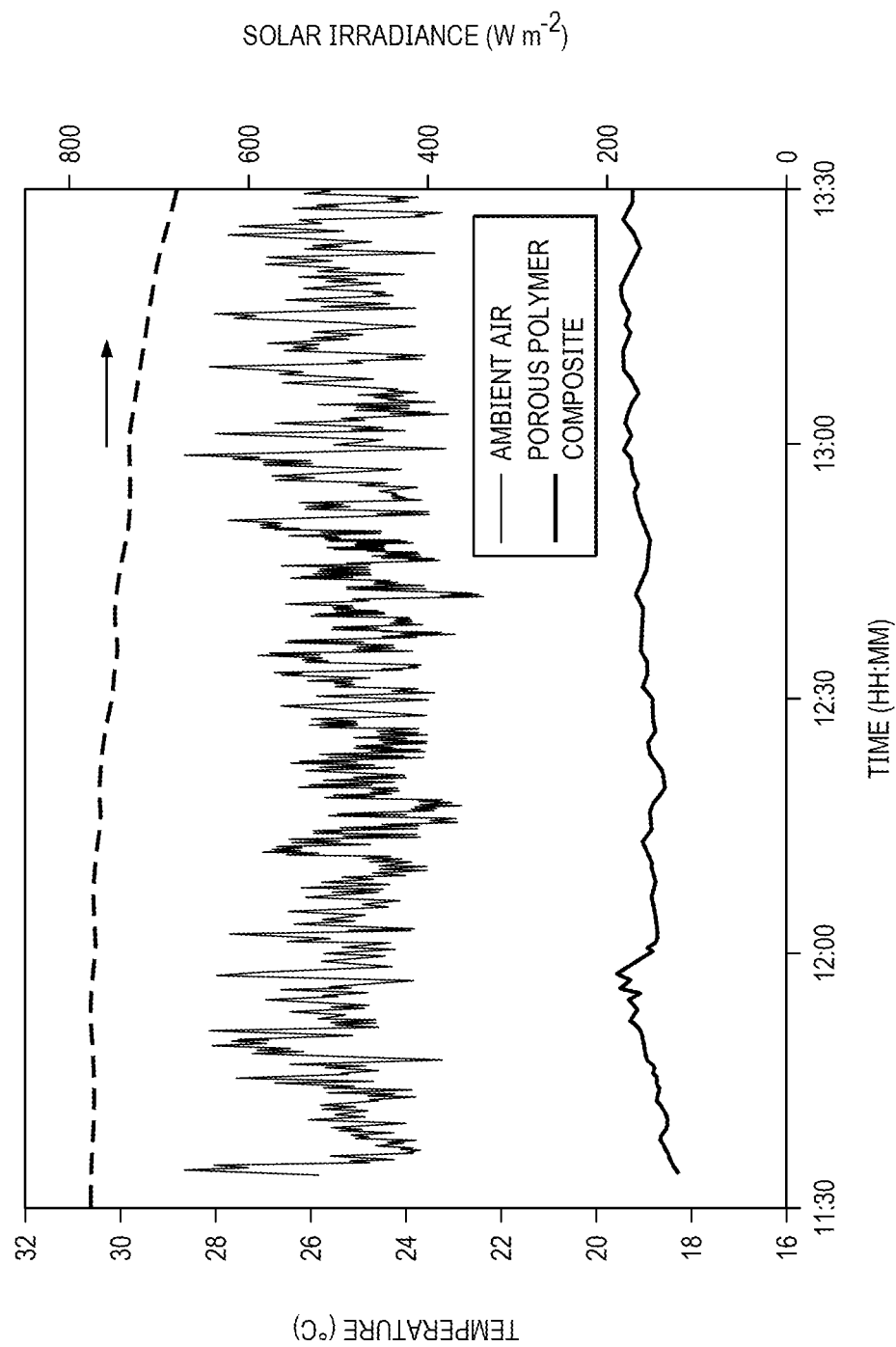
FIG. 12A shows measurement of the subambient temperature drop for an exemplary porous polymer composite as determined by the radiative cooling experiments.
Figure 12B:
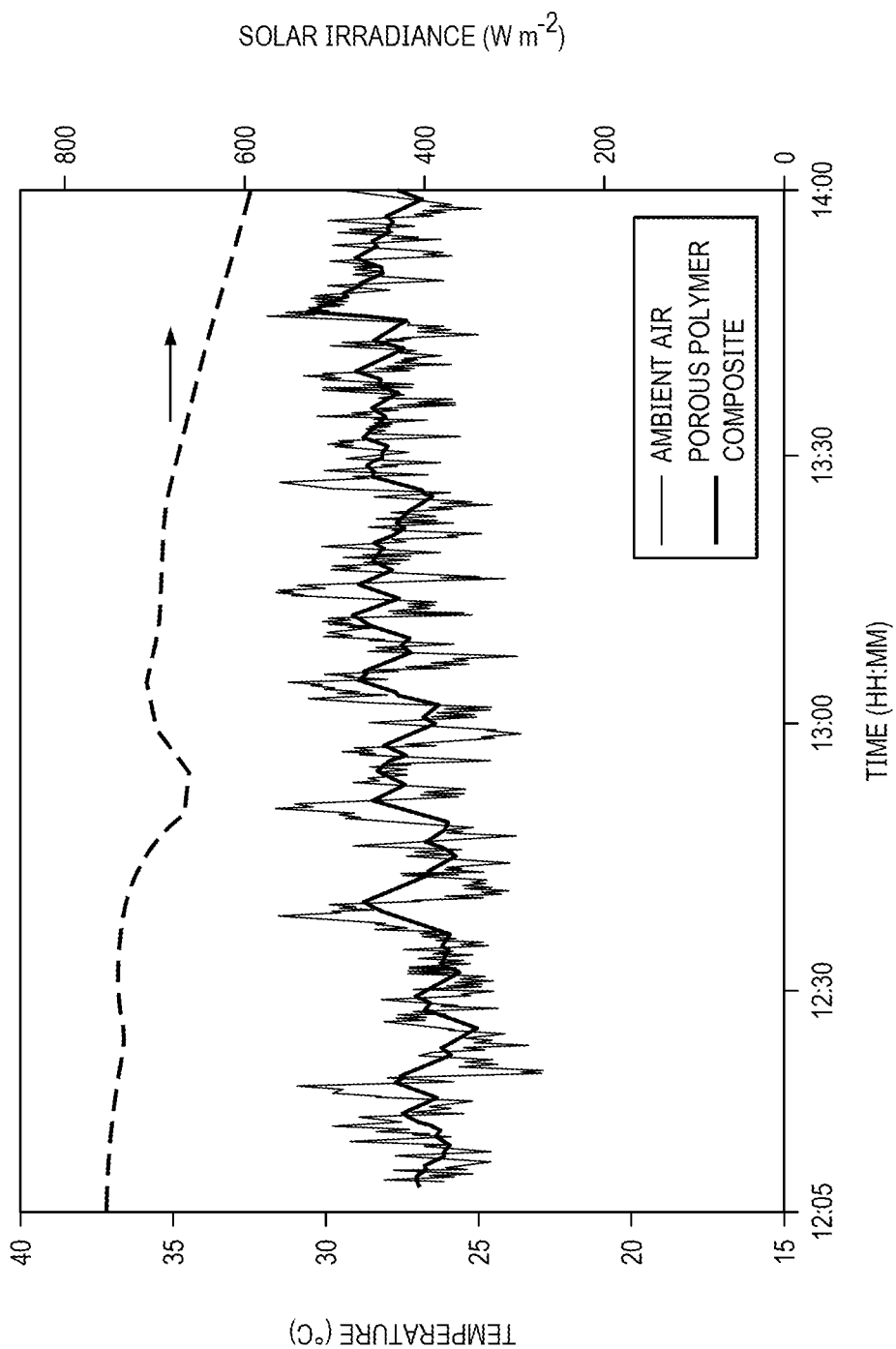
FIG. 12B shows temperature tracking during the measurement of cooling power, as shown in FIG. 12C.
Figure 12C:
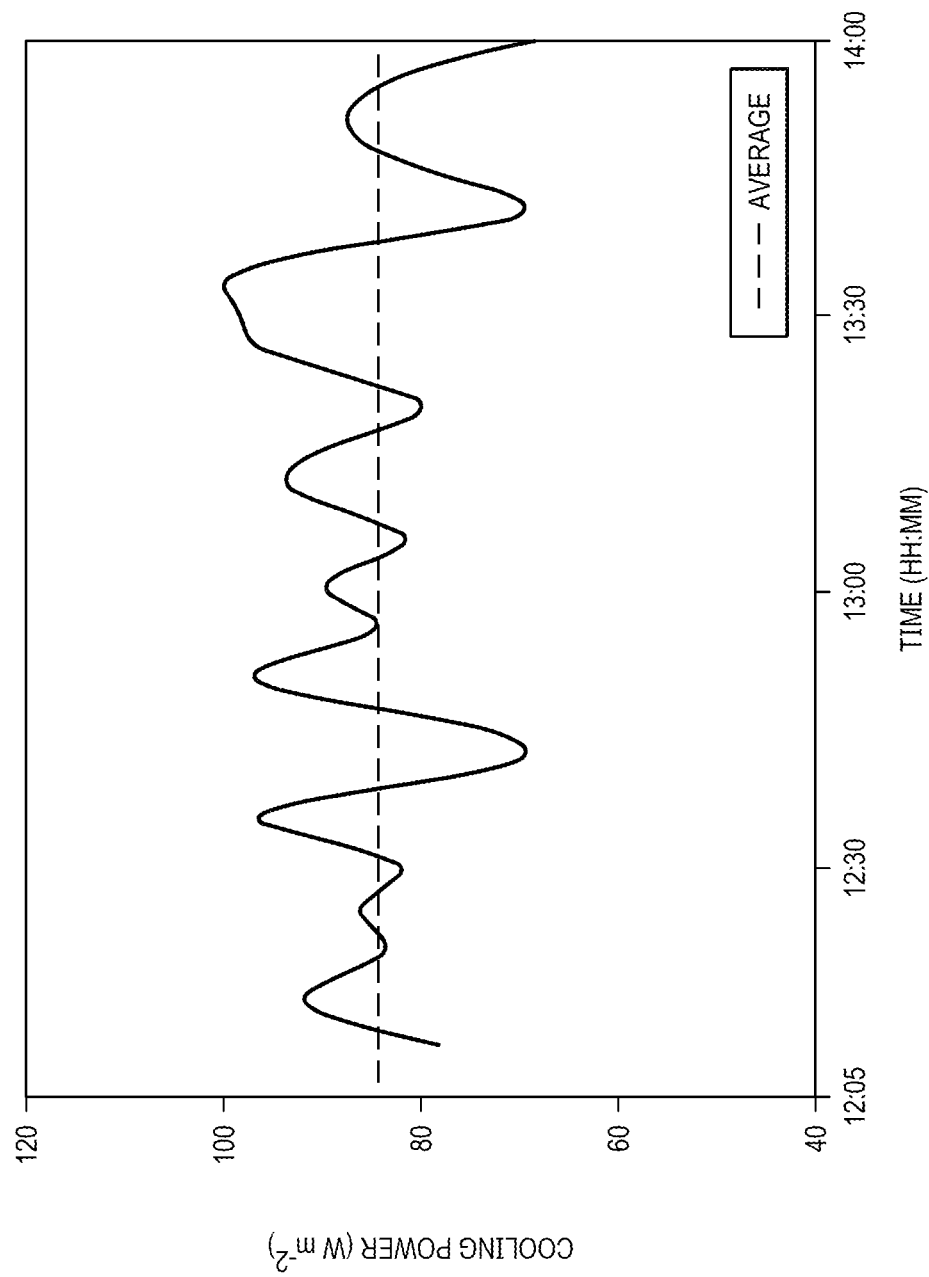
FIG. 12D shows simulated cooling power as a function of ambient temperature with different solar irradiation intensities, where spectral properties used in the simulation were obtained from experimental measurements.
Figure 12D:
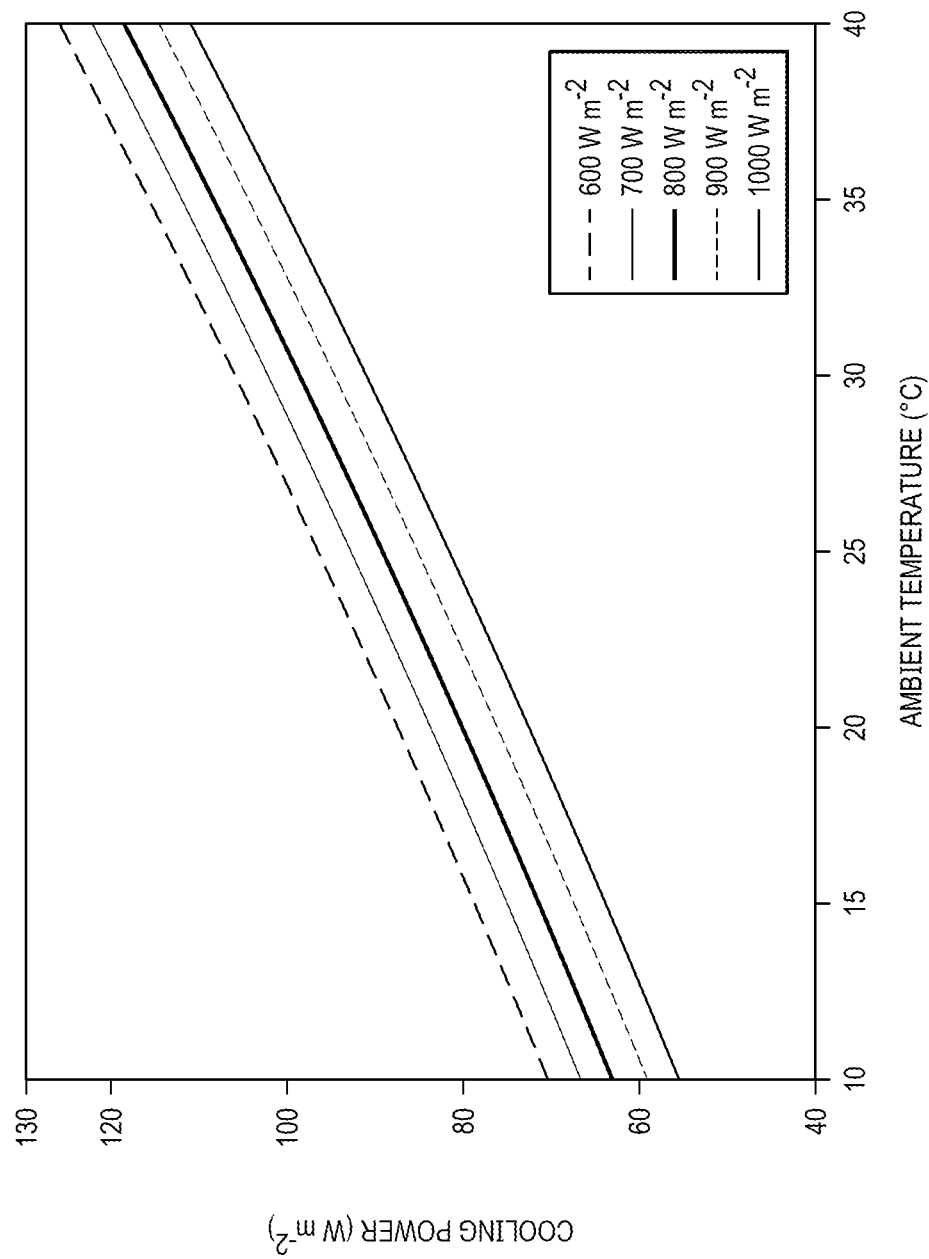

The radiative cooling performance of the porous polymer composites was tested on clear summer days in Champaign, Illinois (40.12° N, 88.24° W). The measurement setup is illustrated in FIG. 11, which was placed on the roof of a three-story building facing the sky directly to record the subambient temperature drop and cooling power in real time. In the setup, convective/conductive heat transfer from the environment is minimized by a polyethylene film and foam, as shown, while the radiative heat exchange between the porous polymer composite and the sky is not hindered owing to the transparency of the polyethylene film. As shown in FIG. 12A, the porous polymer composite film (including a polyethylene matrix and $SiO_2$ particles) achieves an average temperature drop of 6.1° C. below the ambient temperature under a solar irradiance of 747 W/m$^2$ and wind velocity of 6 km/h. This temperature drop test corresponds to the condition when the net cooling power is zero. For the cooling power measurement, which corresponds to a zero subcooling temperature, a feedback-controlled electrical heater is used on the backside to keep the radiative cooling film temperature the same as the ambient temperature, while the heating power is adjusted based on the real-time temperature difference between the film and the environment. Throughout the cooling power test period, the film temperature closely tracks the ambient temperature fluctuation, as shown in FIG. 12B, validating the effectiveness of the feedback-controlled testing setup. The tested cooling power in FIG. 12C attains an average value of 85 W/m$^2$, which matches very well with the simulation results in FIG. 12D. Here, the cooling power simulation is based on a theoretical heat transfer model and performed by home-developed codes using the characterized solar reflectance and infrared emissivity of the porous polymer composite film. Given its high performance of 6.1° C. subambient cooling and 85 W/m$^2$ cooling power, the porous polymer composite shows great potential for radiative cooling applications.

Figure 14:
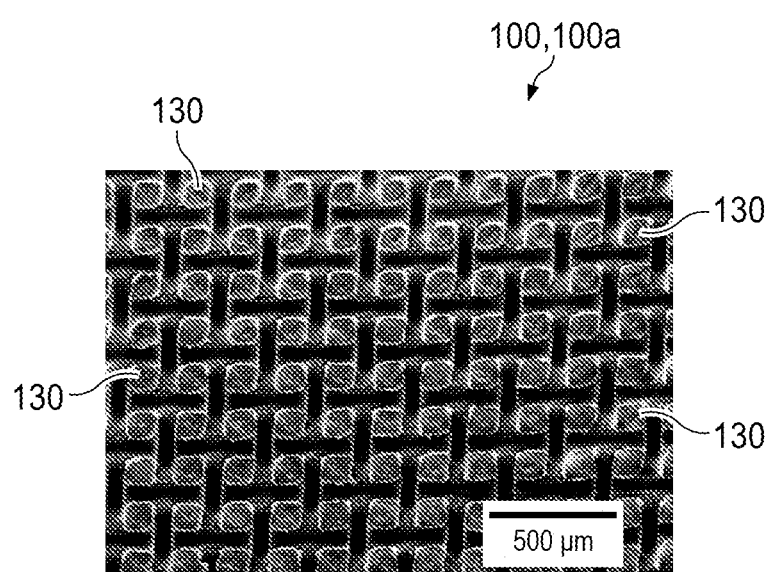
FIG. 14 is a scanning electron microscope (SEM) image showing a portion of a patterned surface formed by compression molding.
Figure 15:
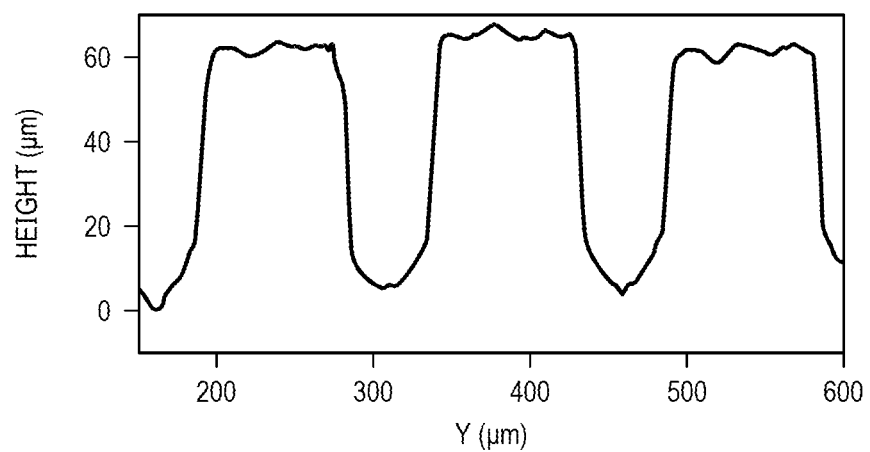
FIG. 15 shows a height profile of several raised features from the patterned surface shown in FIG. 14.
Figure 16:
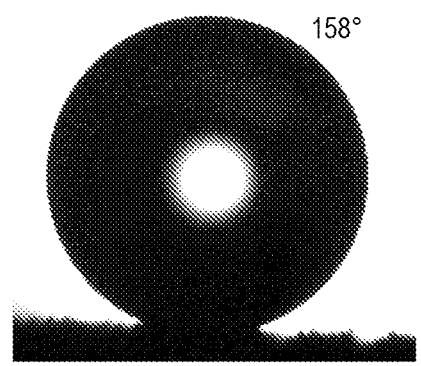
FIG. 16 shows a water droplet having a contact angle of 158° on the patterned surface.
Figure 17:
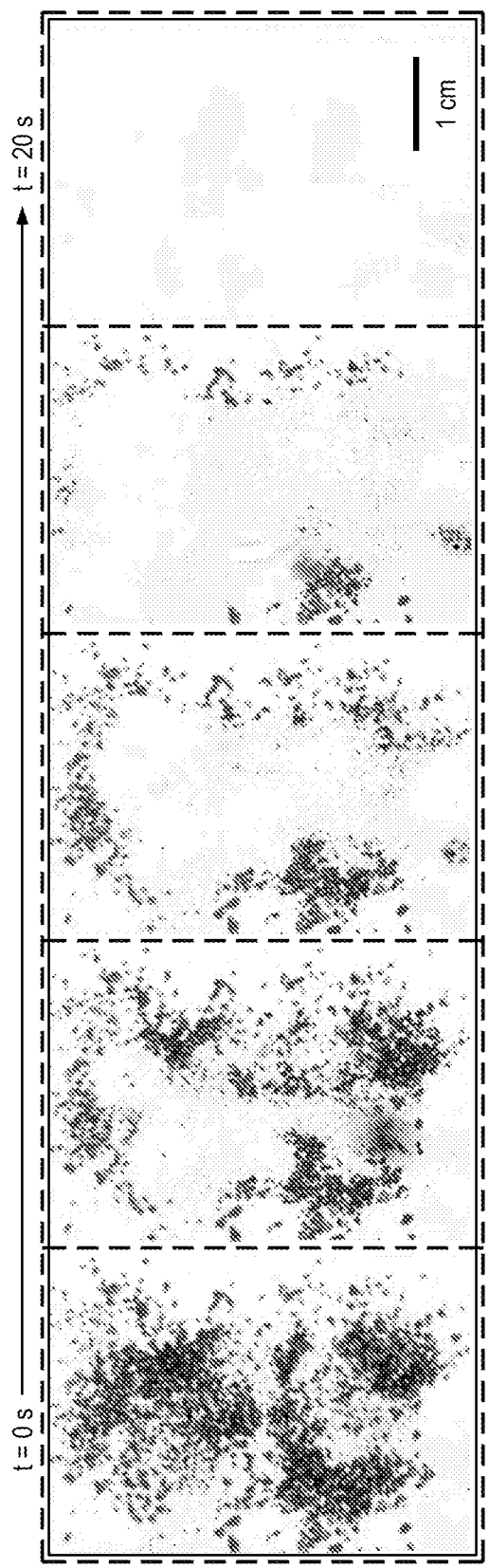
FIG. 17 shows a set of time lapse images revealing the self-cleaning behavior of the patterned surface when coal powder (to simulate dust) is applied and the patterned surface is exposed to water droplets.

In another set of experiments, the hydrophobicity and self-cleaning capabilities of a porous polymer composite having a patterned surface are evaluated. The patterned surface, which in use may function as the solar-facing surface of the composite, includes a pattern of raised features imprinted during fabrication, e.g., using the apparatus shown in FIG. 13. As discussed above, during compression molding, a metal mesh 204 may be placed between the top platen 208 and the surface of the polymer mixture 202, which is positioned on the bottom platen 206, and then the mesh 204 is forced into the surface as the top and bottom platens 208,206 are brought together. The porous polymer composite 100 is formed as described above. The scanning electron microscopy (SEM) image of FIG. 14 shows the resulting pattern of raised features 130 on a portion of the surface 100a of the porous polymer composite 100. In this example, the raised features 130 may be described as square pillars. FIG. 15 shows a height profile (height versus distance Y across the surface) of three of the raised features 130 of FIG. 14. Evaluations of hydrophobicity and self-cleaning properties of the patterned surface yield the results shown in FIGS. 16 and 17. FIG. 16 shows that the patterned surface has a water contact angle in excess of 150° (158° in this example) providing evidence of superhydrophobic behavior. FIG. 17 reveals the behavior of the patterned surface when coal powder is applied (to simulate dust) and the patterned surface is exposed to artificial rain drops. As can be observed by examining the patterned surface as a function of time, the raised features impart a self-cleaning effect which rids the patterned surface of the coal powder during water exposure.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

The invention claimed is:

1. A porous polymer composite for daytime radiative cooling, the porous polymer composite comprising:
   a porous polymer matrix comprising a thermoplastic polymer and including a plurality of pores; and
   selectively emitting particles dispersed in the porous polymer matrix,
   wherein, when exposed to solar radiation, the porous polymer composite comprises an infrared emissivity of at least about 80% in a wavelength range of 8-13 µm and/or a solar reflectivity of at least about 80% in a wavelength range of 0.3-2 µm.

2. The porous polymer composite of claim 1, wherein a weight ratio of the selectively emitting particles to the thermoplastic polymer is at least about 1:5.

3. The porous polymer composite of claim 1, wherein the pores have a range of sizes from about 10 nm to about 5 microns.

4. The porous polymer composite of claim 1, wherein the thermoplastic polymer comprises polyethylene and/or wherein the selectively emitting particles comprise silicon oxide.

5. The porous polymer composite of claim 1, wherein the selectively emitting particles comprise a gradient in concentration in the porous polymer matrix.

6. The porous polymer composite of claim 1 not including a reflective metal layer.

7. The porous polymer composite of claim 1, wherein a solar-facing surface of the porous polymer composite includes a pattern of raised features.

8. The porous polymer composite of claim 7, wherein the solar-facing surface has a water contact angle of greater than 150°.

9. The porous polymer composite of claim 1, further comprising photocatalytic particles embedded in or coated on a surface of the porous polymer matrix to impart antibacterial properties.

10. A cooling system comprising:
    the porous polymer composite of claim 1 disposed on a solar-facing surface to be cooled.

11. The cooling system of claim 10, wherein the solar-facing surface is part of a building, roof, vehicle, tent, or apparel item.

12. A method of making the porous polymer composite for daytime radiative cooling of claim 1, the method comprising:
    mixing together a thermoplastic polymer, selectively emitting particles, and a polymer solvent to form a first polymer mixture;
    forming the first polymer mixture into a predetermined shape at a temperature sufficient to obtain a homogeneous solution of the thermoplastic polymer and the polymer solvent, with the selectively emitting particles distributed therein;
    cooling the predetermined shape, thereby inducing phase separation of the homogeneous solution into a liquid phase comprising the polymer solvent and a solid phase comprising the thermoplastic polymer and the selectively emitting particles; and extracting the liquid phase from the predetermined shape, thereby forming a porous polymer composite comprising a porous polymer matrix with the selectively emitting particles dispersed therein, the porous polymer matrix comprising the thermoplastic polymer and including a plurality of pores.

13. The method of claim 12, wherein the temperature sufficient to obtain the homogeneous solution is at least about 110° C.

14. The method of claim 12, wherein a ratio of weight of the thermoplastic polymer to volume of the polymer solvent is in a range from about 1:2 to about 1:6, the weight being measured in grams and the volume being measured in milliliters.

15. The method of claim 12, wherein the thermoplastic polymer comprises polyethylene, and/or wherein the selectively emitting particles comprise silicon oxide.

16. The method of claim 12, wherein the forming comprises molding, extrusion, spinning, and/or 3D printing.

17. The method of claim 16, wherein the forming comprises compression molding using a molding apparatus, and further comprising:

placing a metal mesh between a surface of the first polymer mixture and a heated platen of the molding apparatus; and pressing the heated platen against the metal mesh, thereby pressing the metal mesh into the surface and imprinting a pattern of raised features.

18. The method of claim 12, wherein a second polymer mixture comprising a different amount of the selectively emitting particles than the first polymer mixture is employed during the forming so as to obtain a gradient in concentration of the selectively emitting particles in the predetermined shape.

19. The method of claim 12, further comprising incorporating photocatalytic particles into or onto a surface of the predetermined shape.

20. The method of claim 12, wherein the predetermined shape comprises a film, a fiber or an arbitrary 3D shape.

* * * * *